United States Patent [19]

Hackemesser et al.

[11] 4,127,389
[45] Nov. 28, 1978

[54] EXCHANGER REACTOR

[75] Inventors: Larry G. Hackemesser; Robert B. Petru, both of Houston, Tex.

[73] Assignee: Pullman Incorporated, Chicago, Ill.

[21] Appl. No.: 784,302

[22] Filed: Apr. 4, 1977

[51] Int. Cl.² ............................. B01J 3/00; B01J 8/06; F28F 9/02; F28F 9/22

[52] U.S. Cl. .................................. 422/201; 165/135; 165/157; 165/159; 422/208; 422/221

[58] Field of Search ................ 23/288 M, 288 K, 289, 23/288 L; 165/158, 159, 161, 135, 136, 160, 157

[56] References Cited

U.S. PATENT DOCUMENTS

| | | | |
|---|---|---|---|
| 2,336,879 | 12/1943 | Mekler | 23/288 M X |
| 2,411,097 | 11/1946 | Kopp | 165/161 X |
| 2,666,692 | 1/1954 | Dolezal et al. | 23/288 M |
| 2,751,756 | 6/1956 | Hughes et al. | 23/288 L X |
| 3,132,691 | 5/1964 | Esleeck | 165/158 X |
| 3,254,967 | 6/1966 | Wentworth | 23/288 K |
| 3,285,713 | 11/1966 | Poehler et al. | 23/288 M |
| 3,398,789 | 8/1968 | Wolowodiuk et al. | 165/159 X |
| 3,480,407 | 11/1969 | Wentworth et al. | 23/289 X |
| 3,666,423 | 5/1972 | Muenger | 23/289 X |
| 3,760,870 | 9/1973 | Guetlhuber | 165/159 X |
| 3,770,059 | 11/1973 | Graham | 23/288 M UX |
| 3,958,951 | 5/1976 | Woebcke et al. | 23/288 M |
| 4,026,675 | 5/1977 | Marsch | 23/288 M |

Primary Examiner—Joseph Scovronek

[57] ABSTRACT

An exchanger reactor including a shell assembly having a tube bundle assembly mounted in and separate from the shell assembly. Inlet and outlet means are provided to the tube bundle assembly which includes a tube inlet chamber, a tube outlet chamber, tubes extending between the tube inlet and outlet chambers and an expansion means positioned between the inlet means to the tube bundle assembly and the inlet chamber for providing relative movement between the shell assembly and the tube bundle assembly. The shell assembly includes a shell inlet chamber and a shell outlet chamber. A heating fluid inlet distributor is positioned between the shell inlet chamber and a main shell heating chamber for initially distributing heating fluid inwardly from the shell inlet chamber into the main heating chamber containing the tube bundle assembly and a fluid outlet distributor is positioned between the shell outlet chamber and the main shell heating chamber for distributing heating fluid radially outwardly from the shell main heating chamber into a shell outlet chamber.

10 Claims, 3 Drawing Figures

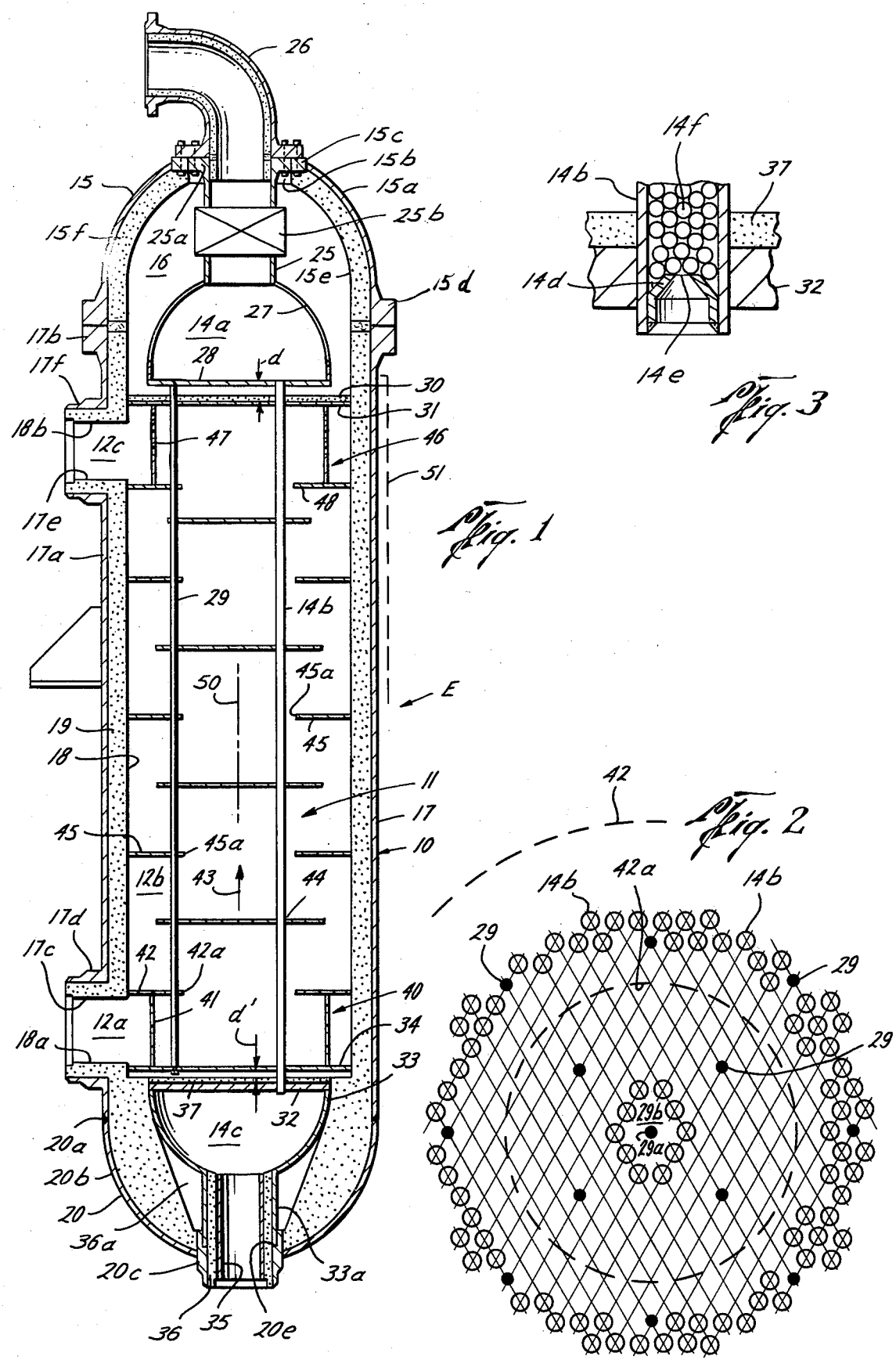

EXCHANGER REACTOR

BACKGROUND OF THE INVENTION

The field of this invention is exchanger reactors.

Exchanger reactors are used to simultaneously heat and chemically react a process fluid passing through the exchanger reactor. One type of exchanger reactor includes a shell having a tube bundle positioned in the shell. The shell directs a heating fluid about the tube bundle; and, the tube bundle includes a plurality of tubes for passing the process fluid to be both heated and chemically reacted. The plurality of tubes of the tube bundle are packed with a catalyst, for example, for causing the process fluid to chemically react in the tubes. An example of an exchanger reactor is illustrated in U.S. Pat. No. 3,972,688 wherein gaseous or vaporized hydrocarbons are passed through a plurality of catalyst-containing tubes in order to produce carbon monoxide and hydrogen containing gases. In U.S. Pat. No. 3,972,688, the catalyst tubes extend through a reactor housing and are positioned at least partly in a heating zone defined by the reactor housing. The portion of the tubes extending into the reactor housing is surrounded by an inner shielding wall which is permeable to an outer shielding wall disposed within the reactor housing for defining a flow passage for the return of the heating gas after flow about the reactor tubes. U.S. Pat. No. 3,958,951 illustrates a reformer furnace wherein a stream of hydrocarbon and steam is passed through the furnace tubes for producing a gaseous hydrocarbon and carbon monoxide mixture.

Of course, exchanger reactors are usable in many different applications in addition to those mentioned, which are described merely to provide examples of such use.

SUMMARY OF THE INVENTION

The new and improved exchanger reactor of the preferred embodiment of this invention is used as an exchanger reactor in various chemical processes. The exchanger reactor of this invention is provided for transferring heat from a high temperature heating fluid to a process fluid flowing through a plurality of tubes. The exchanger reactor of this invention includes a generally cylindrical hollow shell assembly and a tube bundle assembly which is mounted in the hollow shell assembly and cooperates therewith to provide a main shell heating chamber, a shell inlet chamber and a shell outlet chamber for directing a heating fluid through the shell inlet chamber into the main heating chamber and outwardly through the shell outlet chamber. The tube bundle assembly mounted in the shell assembly includes a plurality of tubes positionable in the shell main heating chamber. The tube bundle assembly includes a tube inlet chamber for passing a process fluid to be heated into the plurality of tubes and a tube outlet chamber for passing the process fluid outwardly of the exchanger reactor. A first annular distributor is positioned between the shell inlet chamber and the main shell heating chamber for directing the heating fluid radially inwardly into contact with the plurality of tubes positioned within the main heating chamber. A second annular distributor is positioned between the shell outlet chamber and the main heating chamber for transferring the heating fluid radially outwardly from the main heating chamber after such heating fluid has travelled in alternating radial directions (relative to the common longitudinal axis of the tube bundle assembly and the shell assembly) along the tube assembly and transferred heat thereto. The plurality of tubes of the tube bundle assembly are filled with a catalyst such that the process fluid flowing therethrough is chemically reacted for producing a product such as a synthesis gas.

These features and other features of this invention will be described in detail in the preferred embodiment description which follows. It should be understood that only the claims set forth herein are representative of the exclusive rights for which patent protection is sought.

BRIEF DESCRIPTION OF THE DRAWINGS

FIG. 1 is a sectional view of the improved exchanger reactor of this invention;

FIG. 2 is a sectional view taken along line 2—2 of FIG. 1 illustrating schematically the plurality of tubes of the tube assembly; and FIG. 3 is a detailed view of a catalyst retainer mounted in each of the tubes of the tube bundle.

DESCRIPTION OF THE PREFERRED EMBODIMENT

Referring to the drawings, the letter E generally designates the exchanger reactor of the preferred embodiment of this invention. The exchanger reactor E includes a shell assembly 10 which houses a tube bundle assembly 11. Basically, the shell assembly 10 includes a shell inlet chamber 12a, a main heating chamber 12b and a shell outlet chamber 12c. A heating fluid is directed through the shell inlet chamber 12a into the main heating chamber 12b and outwardly through the shell outlet chamber 12c. The tube bundle assembly 11 includes a tube inlet chamber 14a, a plurality or bundle of tubes 14b (one representative tube is shown in FIG. 1) and a tube outlet chamber 14c. A process fluid to be heated is directed through the tube inlet chamber 14a into the plurality of tubes 14b and outwardly through the tube outlet chamber 14c. The heating fluid, which may approach a high temperature near the failure point of the high temperature metals utilized, transfers heat through the plurality of tubes 14b to the process fluid flowing through the plurality of tubes 14b. The plurality of tubes 14b are filled, such as with catalyst, so that the process fluid flowing through the plurality of tubes is subject to a chemical reaction such as cracking or reforming in order to produce a product which is different in chemical composition from the process fluid entering the reactor. Referring to FIG. 3, the bottom end of each tube has a catalyst retainer means 14d mounted therein to hold the catalyst. The catalyst retainer means 14d is a perforated, conically-shaped element mounted in the bottom tube end by welding or the like and having openings such as 14e to pass the reacted process fluid. One example of such use of the exchanger reactor E is in the production of hydrogen-rich gas wherein hydrocarbon feed is passed through steam reforming catalyst-filled tubes of the tube bundle assembly which are heated by high temperature heating fluid at about 1600°–1900° F. and at a pressure of about 300–1000 psi. The exchanger reactor E can also be used as a heat exchanger by utilizing the plurality of tubes 14b without a catalyst.

The shell assembly 10 includes a generally hemispherically-shaped, hollow top head 15 which includes an outer housing portion 15a which terminates in its upper end in an opening 15b formed by ring 15c and at its lower end in a flange ring 15d. The interior of the head 15 includes an inside liner 15e of suitable material having an insulation layer 15f located between the inside liner 15d and outer housing portion 15a. The inside liner 15e has a hemispherical configuration identical to that of the exterior housing portion 15a thereby creating a dome-shaped interior space 16.

The shell assembly 10 further includes a main, generally cylindrical, hollow housing section 17 including outer housing 17a which is attached to the top head flange ring 15d by an upper flange ring 17b. The outer housing 17a has a lower opening 17c having an inlet nozzle 17d welded thereto for connection to a process line for receiving a heating fluid. The outer housing 17a includes an upper opening 17e having an exit nozzle 17f welded thereto for transferring outwardly of the main housing section 17 the heating fluid after it has been used to transfer heat to the tube bundle assembly 11.

The main housing section 17 further includes a main, inner cylindrical lining 18 positioned within the outer housing 17a and spaced therefrom in order to receive a suitable refractory insulating material 19. The main inner lining 18 further includes an inlet liner 18a positioned within the inlet nozzle 17d and an outlet liner 18b positioned within exit nozzle 17f in order to contain insulation refractory material, also. The insulationn refractory material can be a bubble aluminum such as carborundum "ALFRAX B1 NO. 57" or other suitable refractory material.

A bottom head 20 of a generally hemispherical configuration is welded at 20a to the main housing section 17. The bottom head 20 includes a generally hemispherical outer housing 20b that has a nozzle 20c welded thereto.

The tube bundle assembly 11 includes an inlet tubular section or channel 25 terminating at its upper end in flange ring 25a and extending longitudinally inwardly into the interior space 16. A suitable adapter or neck such as 26 is mounted onto the top head ring 15c and channel flange ring 25a by bolt assemblies to connect the tube bundle assembly 11 to a source of process gas or other fluid. An expansion joint 25b of any well-known variety is mounted in the channel 25 such that the channel is floating to provide for relative movement between the shell 10 and tube bundle assembly 11. A dome-shaped or hemispherical inlet section 27 is mounted onto the bottom end of the channel 25. The inlet section 27 is attached to tube sheet 28 by welding or other means. The tube sheet 28 includes a plurality of openings through which the upper ends of the plurality of tubes 14b extend. The dome-shaped inlet section 27 cooperates with the tube sheet 28 to form the tube inlet chamber 14a. The channel 25 and inlet section 27 is of sufficient size to allow a man to physically enter, remove and reload catalyst from the plurality of tubes 14b.

A circular insulation barrier or wall 30 extends transversely across the upper end of the main housing section liner 18 parallel to the upper tube sheet 28 but spaced therefrom a distance d. The spacing of the entrance insulation wall a distance d away from the tube sheet 28 creates a void to at least eliminate some undesirable heat transfer. The insulation wall 30 is a castable refractory which is constructed prior to installation and includes a plurality of openings through which the plurality of tubes 14b extend. The insulation wall 30 is mounted at the top of the main housing section 17 with its circumferential edge positioned against the inside liner 18. A circular metal plate 31 is mounted adjacent to and supports the insulation wall 30 and thus extends transversely across the upper main housing section 17, also. The plate 31 is not attached to the liner 18, but does fit tightly against it.

The plurality of tubes 14b extend downwardly through the tube sheet 28, the spaced, insulation wall 30, the plate 31, through the main heating chamber 12b and terminates in a tube sheet 32 which is welded or otherwise attached to a dome-shaped or hemispherical outlet section 33. Tie rods 29 (one representative tie rod is shown in FIG. 1) extend downwardly from attachment to tube sheet 28 to a bolted attachment to circular plate 34.

The hemispherical outlet section 33 is connected to an outlet channel 33a which extends downwardly onto a ledge 20e of the nozzle 20c and is welded thereto. An interior liner sleeve 35 is spaced from the channel 33a and nozzle 20c in order to contain an annular layer 36 of castable refractory. A plurality of radially extending gussets 36a are attached to the outside of hemispherical section 33 and extend into engagement with the top rim of the nozzle 20c in order to aid in the support of the complete tube bundle assembly 11. The space between hemispherical section 33 and the head housing 20a is filled with insulation material. The tube sheet 32 cooperates with the hemispherical section 33 to form the tube outlet chamber 14c.

A circular insulation barrier or wall 37 extends transversely across the lower end of the main housing section liner 18 parallel and immediately adjacent to and supported by the bottom tube sheet 32. The insulation wall 37 is a castable refractory which is formed prior to installation and includes a plurality of openings through which the plurality of tubes 14b extend.

The circular plate 34, which is attached to the tie rods 29, is mounted against but is not attached to the inside liner 18 and is spaced from the insulation wall 37 a distance d'. The circular plate 34 includes a plurality of holes through which the plurality of tubes 14b extend. The separation distance d' between the wall 37 and the plate 34 is to prevent at least some undesirable heat loss.

The bottom tube sheet 32 cooperates with the top tube sheet 28 and tie rod attachment plate 34 to provide the primary support for the plurality of tubes 14b. The plurality of tie rods 29 are spaced, as viewed in section in FIG. 2, for supporting the baffle structure to be discussed hereinafter. The pattern for the tubes is illustrated schematically in FIG. 2. Thus, one of the plurality of tubes 14b is actually centered at each intersection point shown in the pattern of lines illustrated in FIG. 2. The geometric configuration for the tubes may be described as being triangular. The purpose of the triangular configuration is to provide an efficient tube surface area for exposure to radial flow of the heating fluid.

A central tie rod 29a extends from the center of the upper tube sheet 28 to the center of tie rod plate 34. However, there are no tubes immediately adjacent to the central tie rod thus providing a longitudinally extending void space 29b along the length of the plurality of tubes 14b between barriers 44, to be described hereinafter. The purpose of the void space 29b is to eliminate tubes which would not receive as much heat as the other tubes and thus would not expand to the same extent as do the other tubes.

A radial flow distributor means generally designated by the number 40 and including annular wall distributor 41 is positioned between the shell inlet chamber 12a and the main heating chamber 12b for initially distributing heating fluid radially inwardly from the shell inlet chamber 12a into the main shell heating chamber 12b. The annular wall 41 is welded or otherwise attached to the transversely extending plate 34 and to an annular flow director or baffle 42 having a central opening 42a. The plurality of tubes 14b extend through a portion of the baffle 42 adjacent opening 42a and through the opening 42a itself. The position of baffle 42 is shown schematically in FIG. 2. The flow director or baffle 42 fits tightly against the main heating chamber liner 18. The circumferentially-shaped shell inlet chamber 12a is formed by circular plate 34, annular distributor 41 and annular plate 42 in cooperation with the liner 18, which forms a circumferential or annular inlet space which receives the heating fluid from nozzle 17d. Thus heating fluid enters through opening 17c, expands into the annular inlet space and is then distributed radially inwardly through the openings in the annular distributor 41 into radial flow engagement with the plurality of tubes 14b.

The heating fluid then flows downstream in the direction of arrow 43 and flows radially outwardly on the downstream side of the flow director 42 and around a second, circular flow director or baffle 44. The flow director 44 is a circular barrier or wall having a diameter approximately equal to the diameter of the plurality of tubes 14b of the tube bundle and having a plurality of openings through which each of the tubes 14b extend to thereby prevent flow across the baffle within the space occupied by the tubes. The circular flow director 44 cooperates with annular flow director 42 to cause the fluid to flow radially outwardly after passing through the opening 42a in the annular flow director 42. Annular flow directors 45, which are structurally identical to flow director 42, and the circular flow directors 44 are alternately spaced along the length of the main heating chamber 12b in order to cause the flow of heating fluid to flow in alternating radial directions (with respect to the longitudinal axis 50 of the tube bundle assembly 11 and shell assembly 10) across the plurality of tubes 14b, which causes efficient heat transfer from the heating fluid to the process fluid flowing through the tubes. Due to the high temperatures of the heating fluid, the utilization of alternating radial flow is very important to uniform heat distribution and temperature gradient along the tube bundle. The distance between baffles 44 and 45 and the relative inside diameter 45a and outside diameter of baffle 44 may vary along the length of the axis 50.

A radial flow outlet distributor means generally designated by the number 46 includes an annular distributor 47 which is attached to the uppermost annular flow director 48 and to the plate 31 by welding or other suitable means. The annular dustributor 47 has a plurality of openings therein in order to pass radially outwardly heating fluid into the annular space or shell outlet chamber 12c formed between the distributor 47 and the inside liner 18. The heating fluid then flows outwardly of shell outlet opening 17e thus exiting the exchanger reactor E.

In operation and use of the exchanger reactor E, it may be necessary from time to time to remove the tube assembly 11. In order to remove the tube assembly 11, the adapter 26 is first removed by releasing the bolt connections of adapter 26 to channel flange ring 25a and to shell head ring 15c. The head 15 can then be lifted off of the main shell section 17 (after release of the connection of flanges 15d and 17b). Next, the inside liner 35 in lower head 20 is removed and the insulation material 36 is chipped away to expose the welded connection between the channel 33a and the nozzle 20c. This weld is then broken which frees the entire tube assembly 11 for removal from the top.

The entire shell assembly 10 is water jacketed as shown schematically by jacket shell 51 to reduce the operating temperature of the shell so that more common metals can be used in shell construction. The jacket shell 51 extends from a position above tube sheet 28 to a position below tube sheet 32.

As previously mentioned, a preferred use of the exchanger reactor E is to carry out a primary reforming process to produce a hydrogen-rich gas or synthesis gas. In the primary reforming process, hydrocarbons are contacted with steam in the presence of steam reforming catalyst. Thus, in the preferred use, a gaseous hydrocarbon, or liquid hydrocarbon which can be gasified, is passed together with steam through the tube assembly 11 and more particularly through the plurality of tubes 14b which are filled with a steam reforming catalyst 17f, such as a commercial nickel catalyst, i.e. nickel on a solid support. The hydrocarbon stream enters the tubes 14b at temperatures less than about 540° C. (1000° F.) and are heated such that the outlet temperatures are maintained at between 730° C. and 925° C. The pressure in the steam reforming process may range from about atmospheric pressure to 75 atmospheres (1100 psi) and preferably reformed gas or synthesis gas is then followed by secondary reforming and other process steps to form a synthesis gas which may be used to produce ammonia, methanol or other products. Such process steps are set forth in U.S. Pat. No. 3,119,667 which is incorporated herein by reference.

Unlike conventional primary reforming where the catalyst filled tubes are in a fired furnace and the endothermic heat of reaction is supplied by combustion of fuel in the radiant zone of the furnace, the endothermic heat of reaction is supplied to the exchanger reactor E by using the effluent stream from the secondary reformer which has an outlet temperature between 870° C. and 1075° C. This stream is directed through the shell inlet chamber 12a into the main heating chamber 12b and outwardly through the shell outlet chamber 12c. It is understood that the pressures of the stream in the tubes 14b and the stream directed through the shell have a differential pressure of 10 to 100 psi although substantial pressures are maintained in the exchanger reactor E. This use has special application in an ammonia process.

The foregoing disclosure and description of the invention are illustrative and explanatory thereof, and various changes in the size, shape and materials as well as in the details of the illustrated construction may be made without departing from the spirit of the invention.

We claim:

1. Apparatus comprising:
   a generally cylindrical hollow shell assembly including a main heating chamber, a shell inlet chamber and a shell outlet chamber for directing a heating fluid through said heating chamber;
   a tube bundle assembly mounted in and separate from said shell assembly;
   inlet means and outlet means for directing a process fluid to be heated through said tube bundle assembly;
   said tube bundle assembly including
   (a) a tube inlet chamber formed by a generally hemispherically-shaped inlet section attached to an inlet tube sheet extending transversely across said hemispherically-shaped inlet section and connected to said inlet means, (b) a tube outlet chamber formed by a generally hemispherically-shaped outlet section attached to an outlet tube sheet extending transversely across said hemispherically-shaped outlet section and connected to said outlet means;

(c) a plurality of tubes which extend between said inlet tube sheet and said outlet tube sheet so as to be positioned in said shell main heating chamber, and (d) expansion means positioned between said inlet means and said inlet chamber for providing relative movement between said shell assembly and said tube bundle assembly;

a radial flow inlet distributor means positioned between said shell inlet chamber and said main heating chamber for initially distributing heating fluid radially inwardly from said shell inlet chamber into said main heating chamber; and a radial flow outlet distributor means positioned between said shell outlet chamber and said main heating chamber for distributing heating fluid radially outwardly from said main heating chamber into said shell outlet chamber.

2. The structure set forth in claim 1, wherein said radial flow inlet distributor means includes;

a plate extending transversely of said shell assembly, an annular flow baffle having a central opening and an annular flow distributor mounted about said plurality of tubes and having openings therein for directing heating fluid radially inwardly from said shell inlet chamber into said main shell heating chamber.

3. The structure set forth in claim 1, wherein said radial flow outlet distributor means includes:

a plate extending transversely of said shell assembly, an annular flow baffle having a central opening and an annular flow distributor mounted about said tubes and having openings therein for directing heating fluid radially outwardly from said main heating chamber into said shell outlet chamber.

4. The structure set forth in claim 1, including:
catalyst retainer means mounted in one end of each tube for retaining a catalyst therein.

5. The structure set forth in claim 1, including:
tie rods extending from said inlet tube sheet to said plate of said radial flow inlet distributor means.

6. The structure set forth in claim 1, including:
an insulation wall extending substantially parallel to said inlet tube sheet but spaced therefrom and forming a domeshaped interior space, said insulation wall having holes therein through which said plurality of tubes extend.

7. The structure set forth in claim 1, including:
an insulation wall extending parallel to and supported by said outlet tube sheet, said insulation wall having holes therein through which said plurality of tubes extend.

8. The structure set forth in claim 2, including:
a plurality of first flow directors which are annular having a central opening substantially as large as said central opening in said annular flow baffle in said radial flow distributor means and positioned at spaced intervals in said main heating chamber; and a plurality of second flow directors which are circular having openings therein through which said individual tubes extend and positioned between said first flow directors in said main heating chamber, said first and second flow directors causing the heating fluid to flow through said main heating chamber in alternating radial directions with respect to the longitudinal axis of said plurality of tubes.

9. The structure set forth in claim 1, including:
a lining positioned within said shell assembly containing a refractory insulating material.

10. The structure set forth in claim 1, including:
a water jacket external of said shell assembly which extends from above said inlet tube sheet to below said outlet tube sheet.

* * * * *